April 3, 1934.　　　J. M. CHRISTMAN　　　1,953,214
MOTOR VEHICLE
Filed Feb. 13, 1932　　　2 Sheets-Sheet 1

Inventor
JOHN M. CHRISTMAN.
By Milton Tibbetts
Attorney

April 3, 1934.                J. M. CHRISTMAN                1,953,214
                                MOTOR VEHICLE
                            Filed Feb. 13, 1932        2 Sheets-Sheet 2

Inventor
JOHN M. CHRISTMAN.
By Mullin-Tibbetts
Attorney

Patented Apr. 3, 1934

1,953,214

UNITED STATES PATENT OFFICE 1,953,214

MOTOR VEHICLE

John M. Christman, Detroit, Mich., assignor to Packard Motor Car Company, Detroit, Mich., a corporation of Michigan Application February 13, 1932, Serial No. 592,827

7 Claims. (Cl. 267—8)

This invention relates to motor vehicles and more particularly to shock absorbers therefor.

When the wheels of a vehicle traveling at an appreciable rate of speed strike an obstruction or rise in the road, a sharp fast blow is transmitted to the suspension springs and they consequently tend to quickly compress permitting the wheels and axles to move upwardly with respect to the frame and body. After the initial rise in the road has been traversed, the springs will tend to rebound thus forcing the frame and body upwardly relative to the wheels and axles. Due to the weight of the body this latter movement is relatively slower and more gradual than the first movement caused by the initial shock. Where shock absorbers are employed to control these spring movements, the ideal construction would be one in which there was substantially no resistance of the shock absorber to the compression movements of the springs but in which there was considerable control of or resistance to the rebound action thereof. With such construction the wheels and axles, when a sharp bump is encountered, will move quickly upwardly without an appreciable amount of such movement being transmitted to the frame and body and the downward movement of the body will be controlled so that it comes to rest in its normal position easily, and without shock to the occupants of the vehicle.

If the wheels of the vehicle encounter a sharp drop in the road, the springs will quickly and sharply expand or rebound, forcing the wheels and axles downwardly relative to the body. When the wheels are again on level ground the body will tend to settle down on the springs thus again compressing them. This latter movement is a more gradual movement than that caused by the initial drop. Where shock absorbers are employed to control these movements the ideal construction would be one in which there is substantially no resistance to the rebound action of the springs and in which there is considerable resistance to the compression action thereof.

The present invention contemplates, and has for one of its objects, the provision of a shock absorber for use with motor vehicles which will offer substantially no resistance to compression movements and a decided yielding resistance to the rebound movements of the suspension springs under some circumstances, and which will offer a resistance to the compression movements and substantially no resistance to the rebound movements under other circumstances.

Another object of the invention is to provide a shock absorber which will offer a yielding resistance to slow gradual shocks imparted thereto but which will offer substantially no resistance to sharp, quick shocks.

These and other objects of the present invention will become apparent from a reading of the following description taken in connection with the accompanying drawings which form a part of this specification, and in which.

Figure 1:
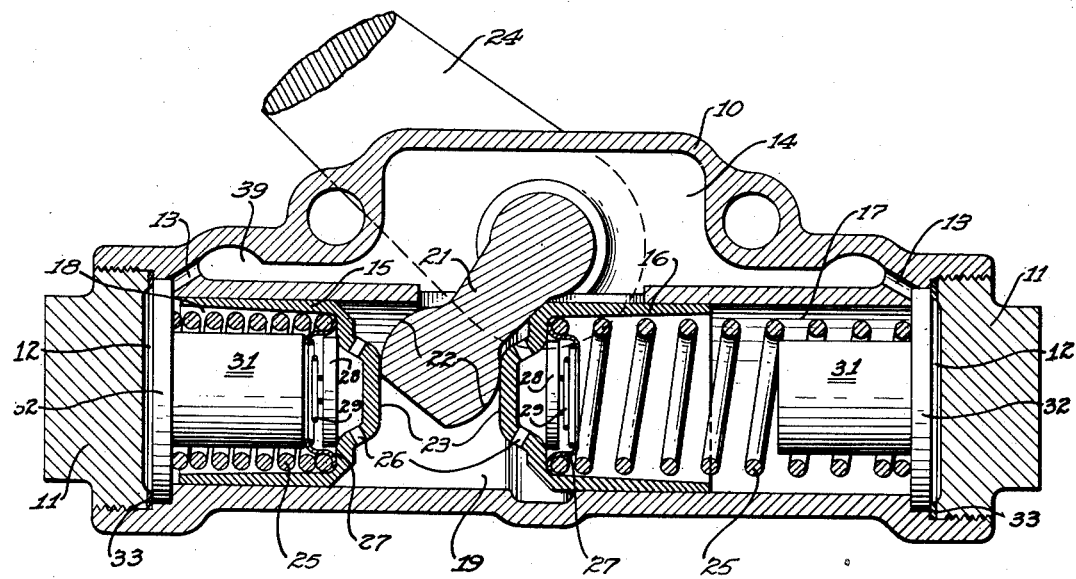
Fig. 1 is a longitudinal sectional view of a shock absorber embodying the present invention.

Referring to the drawings, reference numeral 10 indicates the casing of a hydraulic shock absorber embodying the present invention. The casing is formed with an interior hollow cylindrical chamber extending the full length thereof and is provided with suitable closure members 11 which may be threaded into the end of the casing thus forming a liquid-tight chamber. The closure members have suitable depressions 12 formed on the inner faces thereof communicating with the interior of the cylindrical chamber and with passage-ways 13 formed in the casing which in turn communicate with a fluid reservoir 14 formed in the upper portion of the casing.

A pair of oppositely disposed pistons 15 and 16 are positioned for reciprocatory movement within the cylindrical chamber and divide it into three separate chambers, the piston 16 defining what may be termed the rebound chamber 17 in one end of the casing and the piston 15 defining a compression chamber 18 in the opposite end thereof. The pistons being spaced from each other, another liquid reservoir 19 is formed between the adjacent ends thereof.

The pistons are designed to be reciprocated within the casing to compress the fluid between the closure members 11 and the pistons themselves. For this purpose a rocker lever 21 extends into the cylindrical chamber through an opening in the casing wall and is formed with semi-spherical bearing surfaces 22 to contact the outer bearing faces 23 of the piston heads. The opening in the casing wall also serves to connect the fluid reservoir 14 with the reservoir 19. An extension of the rocker lever extends outwardly through the casing wall and is secured to an operating arm 24 which may be secured to a movable part of the vehicle such as a spring mounted axle movable in a vertical direction relative to the vehicle frame members upon receiving a shock. The casing or body portion of the shock absorber may be secured to a frame member in the well-known manner. The reservoir may be provided wtih a suitable removable closure member, not shown, for the purpose of filling the shock absorber with a fluid.

It will be understood that upon movement of the axle relative to the frame, the suspension springs will be deflected and the arm 24 will be actuated. Movement of the arm will transmit motion to the rocker lever 21 whereby the pistons 15 and 16 will be reciprocated within the chamber to alternately compress the fluid in their respective working chambers 18 and 17. Compression springs 25 are provided to yieldingly urge the pistons toward their retracted positions.

The piston heads are formed with ports 26 which connect the interior thereof with the reservoir 19 so that fluid may flow from the reservoir to the interior of the pistons and vice versa. Flanged ring members 27 are provided interiorly of the pistons and are maintained in position against the head portions thereof by the compression springs 25. Flat "slush" valve members 28 are positioned within the ring members in spaced relation to the ports 26, the peripheral edges thereof being slightly spaced from the ring members 27, and are urged to closed position against the piston heads by light compression springs 29 which bear against the underside thereof and against the inner flanged portions of the ring members 27. These valve members are designed to be opened by the force of the fluid flowing from the reservoir into the piston on the retracting stroke thereof whereby the piston chambers may be quickly filled with fluid. On the compression stroke of the pistons these valves are maintained in closed position prohibiting the passage of fluid from the working chambers to the reservoir through the piston heads.

As previously stated, it is desirable that substantially no resistance will be offered to the compression movements of the pistons when they are subjected to a sharp, fast movement and when subjected to a slow, easy movement considerable fluid pressure resistance will be offered to the compression movements thereof. In accordance with the present invention, a flanged housing member 31 is associated with the casing at each end of the cylindrical chamber. As shown, the flanged portions 32 of the housings extend radially therefrom and engage a shoulder formed in the casing walls near the ends of the cylindrical chamber, and are positioned in abutting relation to the casing walls by the closure members 11. A suitable packing 33 may be provided between the closure members 11 and the flanges 32 forming a liquid-tight seal between the interior of the chamber and the closure members. An auxiliary chamber 30 is formed interiorly of the housing and extends lengthwise thereof, open communication being established between one end of this chamber and the working chamber by an opening or port 34 and communication being established between the other end thereof and the passage-way 12 formed by the closure members 11 through an opening or port 35. The walls of the housing are relatively thick and are provided with a longitudinally extending passage-way 36 which extends through the flanged portion 32 to communicate with the passage-way 12 formed by the closure member. A small passage-way 37 establishes communication between this passage-way 36 and the interior of the auxiliary chamber. The passage-ways 12 of the closure members are connected by means of the passage-ways 13 to extended portions 39 of the reservoir 14. A small port or connecting passage-way 41 establishes constant open communication between the interior of the working chambers and the passage-ways 36 so that fluid is permitted at all times to flow from the working chambers to the fluid reservoir through passage-ways 36, 12, and 13 causing a restricted relief for the fluid in the working chambers when the pistons are compressed. From the foregoing it will be seen that upon compression of the piston, fluid may enter the auxiliary chamber 30 and may also flow from the working chamber through port 41 into the relief passage-way 36 and thence to the reservoir.

Figure 4:
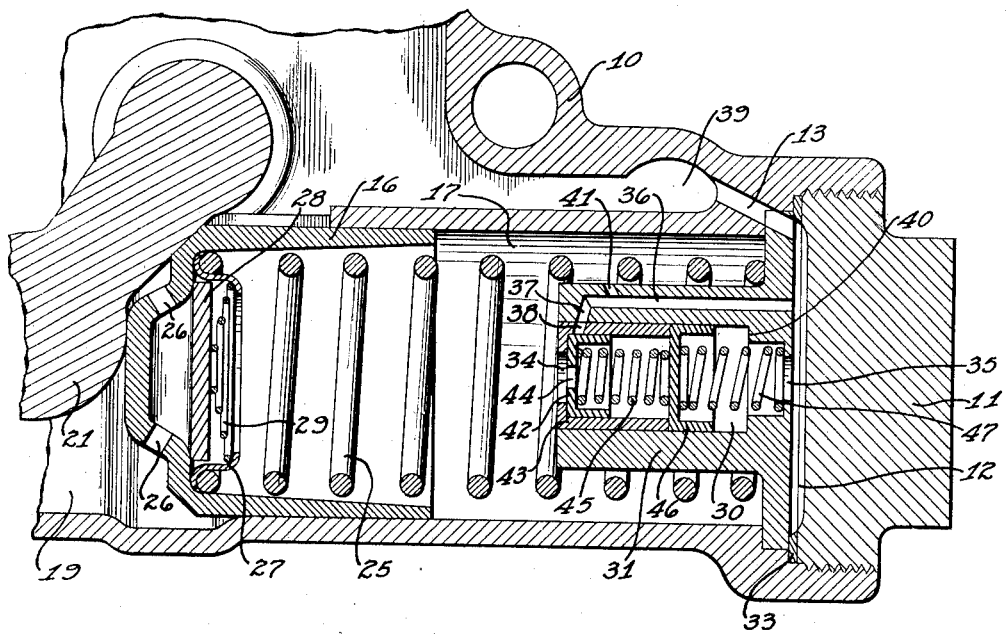
Fig. 4 is a fragmentary enlarged longitudinal sectional view of a shock absorber showing the present invention applied to one of the pistons, the piston being shown in its retracted position.

Within the auxiliary chamber 30 dual fluid pressure relief means are provided whereby the fluid, when the piston is struck a sharp fast blow, will be relieved so that substantially no resistance is offered to the compression movement and when the piston is subjected to a slow, easy movement a restricted fluid pressure relief will be afforded whereby there is a substantial fluid pressure resistance to the compression movements of the piston. As shown, a piston valve 42 is provided within the auxiliary chamber and is designed to reciprocate longitudinally within a bearing sleeve 43 which is tightly fitted within the auxiliary chamber and has a port 38 formed through the wall thereof which connects the passage-way 37 with the interior of the auxiliary chamber. This valve is provided with a port 44 which registers with the port 34 formed in the housing. A compression spring 45 bears against the inner side of the valve 42 and at its other end rests on a reciprocating auxiliary piston 46 whereby the valve 42 is urged to its fully retracted position within the auxiliary chamber. As shown in Fig. 4 when the shock absorber pistons are fully retracted, this reciprocatory valve 42 will completely close the ports 38 and 37 which communicate with the passage-way 36 so that fluid communication between the interior of the auxiliary chamber and the fluid reservoir is prohibited. The auxiliary piston 46 in the auxiliary chamber is somewhat larger than the piston valve 42 and therefore presents a larger surface area for the fluid to contact. This piston is designed to reciprocate between the ends of the sleeve 43 and shoulders 40 formed in the auxiliary chamber 34. A compression spring 47 is provided between the walls of the housing and the piston 46 which urges it to its fully retracted position. When the shock absorber is fully retracted, this small piston 46 is also in its fully retracted position as shown in Fig. 4.

Figure 2:
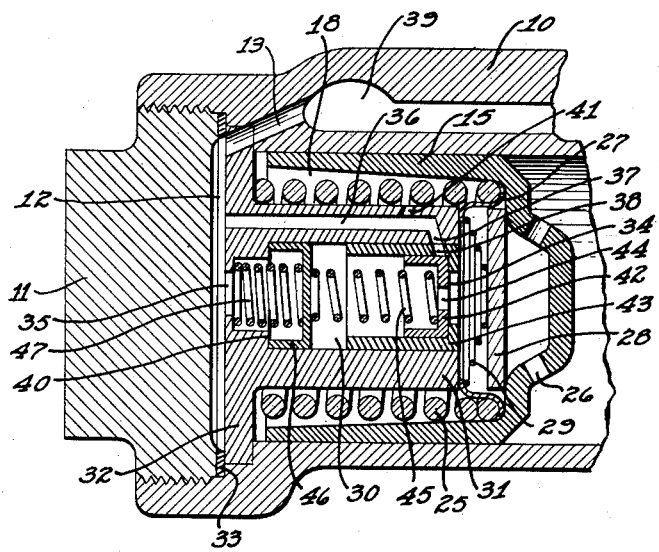
Fig. 2 is a fragmentary enlarged detailed sectional view showing the present invention as applied in connection with one of the shock absorber pistons, the piston being shown in its compressed position.

In Fig. 4, the shock absorber piston is shown in its fully retracted position, the piston valve 42 being fully retracted to close communication between the passageway 36 and the interior of the auxiliary chamber, and the auxiliary piston 46 in the auxiliary chamber being also in its fully retracted position. It may be assumed that the wheels and axles have followed a drop or depression in the road surface and that the frame and body are now moving downwardly to rest in their normal position. This movement of the body is a comparatively slow, easy movement tending to compress the suspension springs. By referring to Fig. 2, it will be seen that as the piston 15, which is the compression piston of the shock absorber, slowly moves to the left or compresses, fluid will be forced from the working chamber 18 through port 41 in the housing into the passage-way 36 and thence to the reservoir through passage-ways 12 and 13. During the compression stroke of the piston, fluid will also enter the auxiliary chamber through the port 44 in the piston valve 42. Because the piston 15 is moving relatively slowly and easily, the fluid pressure exerted on the small contacting surface of the piston valve 42 will not be sufficient to overcome the tension of the spring 45 and this valve 42 will therefore remain in closed position cutting off communication between the relief passage-way 36 and the interior of the auxiliary chamber. The fluid entering the auxiliary chamber through the port 44 in the piston valve will move the auxiliary piston 46 to the left against the pressure of the spring 47 thereby enlarging the auxiliary chamber 30 and constituting a relief for the fluid in the compression chamber 18. The fluid in the auxiliary chamber on the left side of the piston 46 is moved before it through the port 35 into the passage-way 12 and then into the reservoir through the passage-way 13. From this description, it will be seen that if either of the shock-absorber pistons is subjected to a slow, easy compression movement due to the relatively slow deflection of the suspension springs, the flow of fluid from the working chamber to the reservoir is restricted so that the piston will compress relatively slowly thus controlling the deflection of the springs. When the shock absorbers act in this manner the rate of deflection of the suspension springs will be proportionate to the difference between the applied load and the force required to overcome the yieldable fluid pressure resistance to the compression movements of the pistons.

Figure 3:
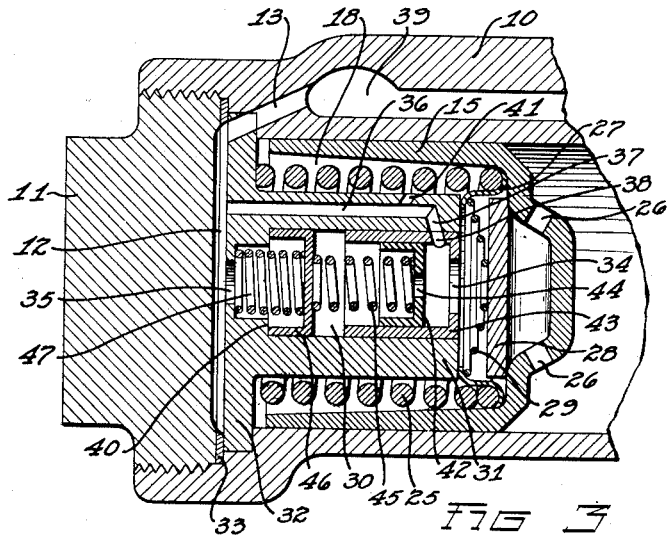
Fig. 3 is a similar view to that of Fig. 2 but showing one of the relief valves constituting a part of the present invention in open position.

As a further example of the operation of this invention, it may be assumed that the wheels have just struck a sharp rise in the road. The wheels and axles will now tend to quickly move upwardly relative to the body and frame so that a sharp, quick movement is imparted to the compression piston 15 of the shock absorber. By referring to Fig. 3, it will be understood that the increased fluid pressure due to the first movement of the shock absorber piston will overcome the tension of the spring 45 to force the piston valve 42 to the left uncovering the ports 37 and 38 and establishing a fluid connection between the interior of the auxiliary chamber and the relief passage-way 36 so that fluid may flow through passage-ways 12 and 13 to the fluid reservoir. This increased pressure also overcomes the pressure of the spring 47 to force the auxiliary piston 46 to its fully compressed position within the auxiliary chamber. It will thus be seen that when the shock absorber piston is subjected to a sharp fast movement due to the relatively sharp deflection of the vehicle suspension spring, sufficient fluid relief is provided due to the movement of the piston valve 42 and the piston 46 in the auxiliary chamber whereby there is substantially no fluid pressure resistance to the compression movement of the shock absorber as the piston compression stroke is completed prior to the time the valve 42 is returned to closed position by its associated spring. It will be understood that the rate of deflection of the suspension springs, in this instance, will be in substantially direct proportion to the applied load. This description of the operation has been confined to the action of the compression piston 15 but it will be understood that the action of the rebound piston and associated parts is exactly the same.

From the foregoing it will be seen that when the shock absorber is subjected to sharp fast movements that a plurality of fluid pressure relief means are actuated whereby substantially no resistance is offered to the compression movements of the pistons thus permitting the suspension springs of the vehicle to deflect in the same manner as if there were no shock absorbers attached thereto. When the pistons are subjected to slow easy compression movements due to the relatively slow deflection of the suspension springs, the fluid relief means within the auxiliary chamber are positioned in a manner whereby a substantial fluid restriction is offered to the compression movements of the shock absorber pistons.

While only one embodiment has been shown and described, it will be apparent that the invention is susceptible of numerous changes in construction and design without departing from the spirit or scope thereof which is to be limited only by the appended claims.

Having thus described the invention what is claimed and desired to be secured by Letters Patent is:

1. In a hydraulic shock absorber, a casing forming a fluid containing working chamber, a piston in the chamber movable to compress the fluid therein, means for moving the piston, means associated with the casing forming an auxiliary fluid chamber, means establishing fluid communication between the working chamber and the auxiliary chamber, a fluid relief passage-way leading from the auxiliary chamber, an auxiliary piston in the auxiliary chamber movable by the pressure of the fluid flowing from the working chamber to enlarge the auxiliary chamber affording relief for the fluid under pressure in the working chamber, yieldable means resisting movement of the auxiliary piston whereby said fluid relief is caused only by a predetermined pressure, a valve in the auxiliary chamber moved by the fluid flowing from the working chamber to open and close communication between the auxiliary chamber and said fluid relief passage-way, and yieldable means resisting movement of the valve whereby said valve is only movable at a second predetermined pressure to afford additional fluid relief through the passage-way.

2. In a hydraulic shock absorber, a casing formed to provide a fluid containing working chamber and a fluid reservoir, a piston in the chamber movable to compress the fluid therein, means for moving the piston, means associated with the casing forming an auxiliary chamber within the working chamber, said auxiliary chamber having open communication with the working chamber, said casing and said auxiliary chamber means being formed to provide a plurality of connecting passage-ways between the interior of the auxiliary chamber and the fluid reservoir, a valve in the auxiliary chamber, and a piston in the auxiliary chamber, said piston being movable under a predetermined fluid pressure to move some of the fluid out of the auxiliary chamber into the reservoir and the valve normally closing one of said passage-ways but being movable under another predetermined fluid pressure to open said passage-way.

3. In a hydraulic shock absorber, a casing formed to provide a fluid containing working chamber and a fluid reservoir, a piston in the chamber, means for moving the piston in the chamber, an auxiliary chamber connected with the working chamber and adapted to communicate with the reservoir, means movable to enlarge the capacity of the auxiliary chamber, said means being responsive to a low range of fluid pressure in the chamber, and valve means movable to establish communication between the auxiliary chamber and the reservoir, said valve means being responsive to fluid pressure in a range greater than that to which the enlarging means is responsive.

4. In a hydraulic shock absorber, a casing formed to provide a fluid containing working chamber and a fluid reservoir, a piston in the chamber, means for moving the piston in the chamber, a member within the chamber forming an auxiliary chamber in open communication with the working chamber and adapted to communicate with the reservoir, means in said auxiliary chamber movable to enlarge the capacity thereof in open communication with the working chamber, said means being responsive to a low range of fluid pressure in the chamber, and valve means movable to establish communication between the auxiliary chamber and the reservoir, said valve means being responsive to fluid pressure in the chamber in a range greater than that to which the enlarging means is responsive.

5. In a hydraulic shock absorber, a casing formed to provide a fluid containing working chamber and a fluid reservoir, a piston in the chamber, means for moving the piston in the chamber, a cylindrical housing fixed in the working chamber and adapted to be telescoped by said piston, said housing having a passage therein adapted to communicate with the reservoir and a port establishing communication between the passage and the working chamber, a spring pressed piston reciprocable in said cylindrical housing responsive to pressure developed in the chamber for enlarging the fluid containing area in the cylindrical housing and a spring pressed valve reciprocable in the cylindrical housing, said valve having an open port through which fluid from the working chamber can pass, the pressure of fluid in the chamber moving said valve to establish communication between the interior of the cylinder and the passage therein leading to the reservoir, said piston being responsive to lower pressure than the valve.

6. In a hydraulic shock absorber, a casing formed to provide a fluid containing working chamber and a fluid reservoir, a piston in the chamber, means for moving the piston in the chamber, a cylindrical housing fixed in the working chamber, a sleeve in the inner end of the cylindrical housing having an opening through the inner face thereof, a passage leading from the interior of the sleeve to the reservoir, a spring pressed piston in the cylindrical housing restricted in its movement in one direction by the cylindrical housing and in the other direction by the sleeve, a spring pressed valve member slidable in the sleeve having an opening registering with the open end of the sleeve and a passage leading through the sleeve and the cylindrical housing establishing communication between the interior of the sleeve and the reservoir, said valve member normally closing the passage in the sleeve but being responsive to pressure in the working chamber to uncover the passage, the piston being responsive to pressure of fluid flowing through the valve member to move in a direction increasing the fluid area within the cylindrical housing, said piston being responsive to a lower pressure than said valve member.

7. In a hydraulic shock absorber, a casing formed to provide a fluid containing working chamber and a fluid reservoir, a cylindrical housing extending into the chamber and having a flanged end forming the end of the chamber, means for securing the flanged end of the cylindrical housing in the casing, a piston reciprocable in the chamber telescopically associated with said cylindrical housing, said piston having a ported head wall, a ring within said piston having oppositely extending flange portions, the out-turned flange portion being adapted to engage against the head wall of said piston, a coil spring engaging the out-turned flange portion of the ring at one end and the flanged portion of the cylindrical housing at the other end, said spring holding said ring against the head wall of the piston, a plate valve reciprocable within said ring and adapted to engage the piston head wall to control the flow of fluid from the piston ports to the interior of the piston, a coil spring engaging the plate valve at one end and the inturned flange of the ring at the other end, said coil spring being under less compression than the other spring, and means associated with the cylindrical housing establishing a restricted flow of fluid from the interior of the piston to the reservoir when the valve is unseated.

JOHN M. CHRISTMAN.